(12) United States Patent
Liu

(10) Patent No.: US 12,221,528 B2
(45) Date of Patent: Feb. 11, 2025

(54) METHOD FOR PREPARING NANOCOMPOSITE MATERIAL FOR TOE CAP PRODUCTION

(71) Applicant: DONGGUAN TTI COMPOSITE MATERIAL TECHNOLOGY CO. LTD, Dongguan (CN)

(72) Inventor: Huiming Liu, Ji'an (CN)

(73) Assignee: DONGGUAN TTI COMPOSITE MATERIAL TECHNOLOGY CO. LTD, Dongguan (CN)

( * ) Notice: Subject to any disclaimer, the term of this patent is extended or adjusted under 35 U.S.C. 154(b) by 115 days.

(21) Appl. No.: 18/122,810

(22) Filed: Mar. 17, 2023

(65) Prior Publication Data

US 2023/0235154 A1 Jul. 27, 2023

(30) Foreign Application Priority Data

Jan. 24, 2022 (CN) .......................... 202210082079.1

(51) Int. Cl.
| | |
|---|---|
| B29C 70/02 | (2006.01) |
| A43B 1/10 | (2006.01) |
| A43B 1/14 | (2006.01) |
| A43D 11/12 | (2006.01) |
| B29C 45/14 | (2006.01) |
| C08L 23/06 | (2006.01) |

(52) U.S. Cl.
CPC ............... *C08L 23/06* (2013.01); *A43B 1/10* (2013.01); *A43B 1/14* (2013.01); *A43D 11/12* (2013.01); *B29C 45/14* (2013.01); *C08L 2201/08* (2013.01)

(58) Field of Classification Search
CPC ......... A43B 13/41; A43B 17/16; A43B 23/08; A43B 23/081; A43B 23/086
See application file for complete search history.

(56) References Cited

U.S. PATENT DOCUMENTS

| | | | | |
|---|---|---|---|---|
| 1,979,461 | A * | 11/1934 | Frazier ................. | A43B 23/086 36/77 M |
| 5,210,963 | A * | 5/1993 | Harwood ............. | A43B 23/086 36/77 R |
| 5,832,633 | A * | 11/1998 | Wang .................. | A43B 23/086 36/77 R |
| 6,159,589 | A * | 12/2000 | Isenberg ............. | A43B 23/086 442/104 |
| 6,367,170 | B1 * | 4/2002 | Williams ............. | A43B 23/086 36/77 R |
| 2008/0163519 | A1 * | 7/2008 | Sartor ................. | A43B 23/086 36/77 R |
| 2010/0236105 | A1 * | 9/2010 | Almaguer ............ | A43D 1/08 36/77 R |
| 2015/0342301 | A1 * | 12/2015 | Hsieh .................. | A43B 23/086 12/146 D |
| 2016/0021969 | A1 * | 1/2016 | Lettow, II ........... | A43B 13/026 36/87 |

FOREIGN PATENT DOCUMENTS

| | | | | |
|---|---|---|---|---|
| CN | 1913797 A | * | 2/2007 | ....... A41D 19/01558 |
| CN | 109354744 A | * | 2/2019 | ............... A43B 1/14 |

OTHER PUBLICATIONS

Liu, F., English translation of CN-104382284-A (2015), 2 pages. (Year: 2015).*
Mittal, G., V. Dhand, K.Y. Rhee, S.-J. Park, W.R. Lee, A review on carbon nanotubes and graphene as fillers in reinforced polymer nanocomposites, J. of Industrial and Engineering Chemistry, vol. 21 (2015), pp. 11-25. (Year: 2015).*
Rodrigues, P.A.V., Development of Polymeric Systems for Safety Footwear, Doctoral Thesis in Science and Engineering of Polymers and Composites, Universidade do Minho (2020), pp. i-37 (Year: 2020).*

* cited by examiner

*Primary Examiner* — Matthew J Daniels
(74) *Attorney, Agent, or Firm* — Daniel M. Cohn; Howard M. Cohn

(57) ABSTRACT

The present invention discloses a method for preparing a nanocomposite material for toe cap production. The nanocomposite material is made of graphene, carbon nanotubes, fiber composition, a silane coupling agent, acetic acid, acrylate rubber, a dispersant, polyethylene resin, nano-silicon carbide, calcium stearate, zinc stearate, talcum powder, modified boron nitride, a curing agent and other materials. The preparation method is convenient and simple and is suitable for large-scale production; the nanocomposite material has high toughness and strength and good water resistance, wear resistance and aging resistance; all materials have a good combination effect with the fiber composition, therefore the nanocomposite material has good mechanical properties and a light weight.

8 Claims, No Drawings

METHOD FOR PREPARING NANOCOMPOSITE MATERIAL FOR TOE CAP PRODUCTION

TECHNICAL FIELD

The present invention relates to the technical field of new materials, in particular to a method for preparing a nanocomposite material for toe cap production.

BACKGROUND

In the prior art, there are many problems in fiber materials, such as easy fracture, poor wear resistance, heavy weight, poor elasticity, low strength, etc. In order to improve the performance of fiber materials, graphene materials and carbon nanotubes can be combined with fiber materials. For example, China invention patent with the patent number of CN201811237587.2 entitled "nanocomposite material and preparation method thereof and toe cap" discloses a nanocomposite material, which is made of various raw materials, including graphene, carbon nanotubes, fiber compositions, resin mixtures, thickening mixtures and dispersants, but the mechanical properties and dispersibility of the nanocomposites still need to be strengthened.

SUMMARY

The purpose of the present invention is to overcome the above defects in the prior art and provide a preparation method of nanocomposite materials for toe cap production.

In order to achieve the above purpose, the present invention provides a method for preparing a nanocomposite material for toe cap production, which includes the following steps:

(1) preparing the following raw materials: 20-40 parts of graphene, 10-20 parts of carbon nanotubes, 50-100 parts of a fiber composition, 5-10 parts of a silane coupling agent, 2-5 parts of acetic acid, 40-80 parts of acrylate rubber, 1-5 parts of a dispersant, 100-150 parts of polyethylene resin, 10-20 parts of nano silicon carbide, 5-10 parts of calcium stearate, 5-10 parts of zinc stearate, 10-20 parts of talcum powder, 10-20 parts of modified boron nitride and 60-80 parts of a curing agent;

(2) preparing graphene into graphene oxide by a Hummers method;

(3) immersing the graphene oxide, the carbon nanotubes and the nano silicon carbide in the silane coupling agent, and reacting at 80-90° C. for 1-2 hours;

(4) putting the mixture obtained in the step (3) and the ground talcum powder into a high-speed stirrer to be stirred for 10-40 min, and adding the acetic acid into the talcum powder under stirring;

(5) continuously adding the dispersant, the calcium stearate, the zinc stearate, the modified boron nitride and the curing agent for full and uniform mixing;

(6) adding the acrylate rubber and the polyethylene resin into an internal mixer for internal mixing, and then putting an internally mixed rubber compound and 50% of the mixture prepared in step (4) into an open mill for mixing at 100-110° C. for 6-8 min;

(7) coating the remaining 50% of the mixture prepared in the step (4) on a surface of a fiber composition with a reticular structure and curing at a temperature of 20-40° C. for 2-4 h; and (8) putting the mixed fiber material prepared in the step (7) into a mold, and injecting the mixed rubber compound mixed in the step (6) to form a toe cap-shaped nanocomposite material.

The fiber composition was configured to have a reticular structure formed by interweaving a plurality of composite fibers, and each composite fiber was twisted together by glass fiber, carbon fiber and asbestos fiber.

The glass fiber was alkali-free glass fiber; the diameter of glass fiber was 10-30 microns, the diameter of carbon fiber was 10-30 microns and the diameter of asbestos fiber was 50-80 microns.

The preparation method of the modified boron nitride was as follows:

putting hexagonal boron nitride and 5-aminovaleric acid into ball milling equipment, adding ethanol, implementing ball milling, followed by filtering and drying, subsequently adding the mixture into a concentrated sulfuric acid solution, and then adding aminophenyl diazonium salt for a coupling reaction to obtain the modified boron nitride.

The silane coupling agent was a composition of vinyl trimethoxysilane, γ-glycidyl ether oxypropyl trimethoxysilane and γ-aminopropyl triethoxysilane, and the mass ratio of the three was 1:2-4:1-3.

The dispersant was vinyl bisstearamide. The curing agent waster t-butyl peroxybenzoate. The mesh number of talcum powder was 800-1250 mesh.

Compared with the prior art, the present invention has the following beneficial effects.

1. The nanocomposite of the present invention is made of graphene, carbon nanotubes, a fiber composition, a silane coupling agent, acetic acid, acrylate rubber, a dispersant, polyethylene resin, nano silicon carbide, calcium stearate, zinc stearate, talcum powder, modified boron nitride and a curing agent, etc. The formulation design is novel and reasonable, the preparation is convenient and simple, which is suitable for large-scale production. Tthe nanocomposite material has high toughness and strength and good water resistance, wear resistance and aging resistance; all materials have a good combination effect with the fiber composition, therefore the nanocomposite material has good mechanical properties and a light weight.

2. The graphene oxide of the present invention has a large number of oxygen-containing functional groups and thus has good dispersibility. After being add into the silane coupling agent, graphene oxide and carbon nanotubes can form a three-dimensional framework structure with nano silicon carbide, which can improve the compatibility and dispersibility of raw materials, effectively reduce the occurrence of agglomeration, and increase the toughness and strength of the material. Moreover, the silane coupling agent can modify the surface of graphene and improve the interface bonding force between polyethylene resin and graphene.

3. With the modification of the silane coupling agent and acetic acid, the talcum powder of the present invention can be modified to form modified talcum powder, which has good dispersibility and compatibility with polyethylene resin and acrylate rubber, and improves the mechanical properties of the composite material. Moreover, talcum powder can complement the structural form of graphene, and talcum powder can be effectively embedded into the composite material to be used as a filler, which can effectively reduce the stacking or agglomeration of graphene and further improve the strength of the composite material.

4. The carbon nanotubes of the present invention after being modified by the silane coupling agent obtains greatly improved surface polarity, dispersibility, interfacial compatibility with polyethylene resin, and thus has a better enhancing effect.
5. The modified boron nitride of the present invention has good lubricity, and can better polymerize the fiber composition with polyethylene resin and acrylate rubber.
6. The acrylate rubber can better coat the fiber composition and improve the mixing effect of the fiber composition and polyethylene resin.
7. The calcium stearate and zinc stearate can better improve the flow and dispersion effects of graphene, carbon nanotubes and nano silicon carbide in polyethylene resin.
8. The acetic acid of the present invention can not only form a modifier with the silane coupling agent, but also provide acidic conditions to hydrolyze the coupling agent, so that the coupling agent has a sufficient degree of hydrolysis.
9. The fiber composition of the present invention has a reticular structure formed by interweaving multiple strands of composite fibers; each strand of composite fiber is twisted together by glass fiber, carbon fiber and asbestos fiber; glass fiber and carbon fiber have high strength, and asbestos fiber has good adsorption, and the asbestos fiber can make glass fiber and carbon fiber better adhere to polyethylene resin and acrylate rubber, thus improving the strength of the nanocomposite material, making the connection more firm and stable, and overcoming the problem of poor adhesion of single glass fiber and rubber.
10. The silane coupling agent of the present invention adopts the combination of γ-glycidyl ether oxypropyl trimethoxysilane, γ-aminopropyl triethoxysilane and vinyl trimethoxysilane, which can better improve the affinity between graphene, carbon nanotubes, fiber composition and other materials. The three coupling agents closely connect various materials, thus achieving good mechanical strength and well ensuring the bonding effect between fiber composition and polyethylene resin and acrylate rubber.

DESCRIPTION OF EMBODIMENTS

Example 1

Example 1 of the present invention provided a nanocomposite material for toe cap production, which included the following raw materials in parts by weight:

20 parts of graphene, 10 parts of carbon nanotubes, 50 parts of a fiber composition, 5 parts of a silane coupling agent, 2 parts of acetic acid, 40 parts of acrylate rubber, 1 part of a dispersant, 100 parts of polyethylene resin, 10 parts of nano silicon carbide, 5 parts of calcium stearate, 5 parts of zinc stearate, 10 parts of talcum powder, 10 parts of modified boron nitride and 60 parts of a curing agent.

The preparation method of the nanocomposite material included the following steps:
(1) preparing materials;
(2) preparing graphene into graphene oxide by a Hummers method;
(3) immersing graphene oxide, carbon nanotubes and nano silicon carbide in the silane coupling agent, and reacting at 80° C. for 1 hour;
(4) putting the mixture obtained in the step (3) and the ground talcum powder into a high-speed stirrer to be stirred for 10 min, and adding the acetic acid into the talcum powder under stirring;
(5) continuously adding the dispersant, the calcium stearate, the zinc stearate, the modified boron nitride and the curing agent for full and uniform mixing;
(6) adding the acrylate rubber and the polyethylene resin into an internal mixer for internal mixing, and then putting an internally mixed rubber compound and 50% of the mixture prepared in step (4) into an open mill for mixing at 100° C. for 6 min;
(7) coating the remaining 50% of the mixture prepared in the step (4) on a surface of a fiber composition with a reticular structure and curing at a temperature of 20° C. for 2 h; and
(8) putting the mixed fiber material prepared in the step (7) into a mold, and injecting the mixed rubber compound mixed in the step (6) to form a toe cap-shaped nanocomposite material.

The fiber composition was configured to have a reticular structure formed by interweaving a plurality of composite fibers, and each composite fiber was twisted together by glass fiber, carbon fiber and asbestos fiber. The glass fiber was alkali-free glass fiber; the diameter of glass fiber was 10 microns, the diameter of carbon fiber was 10 microns and the diameter of asbestos fiber was 50 microns.

The preparation method of the modified boron nitride was as follows:
putting hexagonal boron nitride and 5-aminovaleric acid into ball milling equipment, adding ethanol, implementing ball milling, followed by filtering and drying, subsequently adding the mixture into a concentrated sulfuric acid solution, and then adding aminophenyl diazonium salt for a coupling reaction to obtain the modified boron nitride.

The silane coupling agent was a composition of vinyl trimethoxysilane, γ-glycidyl ether oxypropyl trimethoxysilane and γ-aminopropyl triethoxysilane, and the mass ratio of the three was 1:2:1.

The dispersant was vinyl bisstearamide. The curing agent waster t-butyl peroxybenzoate. The mesh number of talcum powder was 800 mesh.

Example 2

Example 2 of the present invention provided a nanocomposite material for toe cap production, which included the following raw materials in parts by weight:

30 parts of graphene, 15 parts of carbon nanotubes, 80 parts of fiber composition, 8 parts of a silane coupling agent, 3 parts of acetic acid, 60 parts of acrylate rubber, 3 parts of a dispersant, 120 parts of polyethylene resin, 15 parts of nano silicon carbide, 8 parts of calcium stearate, 8 parts of zinc stearate, 15 parts of talcum powder, 15 parts of modified boron nitride and 70 parts of a curing agent.

The preparation method of the nanocomposite material included the following steps:
(1) preparing materials;
(2) preparing graphene into graphene oxide by a Hummers method;
(3) immersing graphene oxide, carbon nanotubes and nano silicon carbide in the silane coupling agent, and reacting at 80-90° C. for 1 hour;
(4) putting the mixture obtained in the step (3) and the ground talcum powder into a high-speed stirrer to be stirred for 10 min, and adding the acetic acid into the talcum powder under stirring;

(5) continuously adding the dispersant, the calcium stearate, the zinc stearate, the modified boron nitride and the curing agent for full and uniform mixing;
(6) adding the crylate rubber and the polyethylene resin into an internal mixer for internal mixing, and then putting an internally mixed rubber compound and 50% of the mixture prepared in step (4) into an open mill for mixing at 100° C. for 7 min;
(7) coating the remaining 50% of the mixture prepared in the step (4) on a surface of a fiber composition with a reticular structure and curing at a temperature of 30° C. for 3 h; and
(8) putting the mixed fiber material prepared in the step (7) into a mold, and injecting the mixed rubber compound mixed in the step (6) to form a toe cap-shaped nanocomposite material.

The fiber composition was configured to have a reticular structure formed by interweaving a plurality of composite fibers, and each composite fiber was twisted together by glass fiber, carbon fiber and asbestos fiber. The glass fiber was alkali-free glass fiber; the diameter of glass fiber was 20 microns, the diameter of carbon fiber was 20 microns and the diameter of asbestos fiber was 60 microns.

The preparation method of the modified boron nitride was as follows:
putting hexagonal boron nitride and 5-aminovaleric acid into ball milling equipment, adding ethanol, implementing ball milling, followed by filtering and drying, subsequently adding the mixture into a concentrated sulfuric acid solution, and then adding aminophenyl diazonium salt for a coupling reaction to obtain the modified boron nitride.

The silane coupling agent was a composition of vinyl trimethoxysilane, γ-glycidyl ether oxypropyl trimethoxysilane and γ-aminopropyl triethoxysilane, and the mass ratio of the three was 1:3:2.

The dispersant was vinyl bisstearamide. The curing agent was tert-butyl peroxybenzoate. The mesh number of talcum powder was 1000 mesh.

Example 3

Example 3 of the present invention provided a nanocomposite material for toe cap production, which included the following raw materials in parts by weight:
40 parts of graphene, 20 parts of carbon nanotubes, 100 parts of fiber composition, 10 parts of a silane coupling agent, 5 parts of acetic acid, 80 parts of acrylate rubber, 5 parts of a dispersant, 150 parts of polyethylene resin, 20 parts of nano silicon carbide, 10 parts of calcium stearate, 10 parts of zinc stearate, 20 parts of talcum powder, 20 parts of modified boron nitride and 80 parts of a curing agent.

The preparation method of the nanocomposite material included the following steps:
(1) preparing materials;
(2) preparing graphene into graphene oxide by a Hummers method;
(3) immersing graphene oxide, carbon nanotubes and nano silicon carbide in the silane coupling agent, and reacting at 90° C. for 2 hour;
(4) putting the mixture obtained in the step (3) and the ground talcum powder into a high-speed stirrer to be stirred for 40 min, and adding the acetic acid into the talcum powder under stirring;
(5) continuously adding the dispersant, the calcium stearate, the zinc stearate, the modified boron nitride and the curing agent for full and uniform mixing;
(6) adding the crylate rubber and the polyethylene resin into an internal mixer for internal mixing, and then putting an internally mixed rubber compound and 50% of the mixture prepared in step (4) into an open mill for mixing at 110° C. for 8 min;
(7) coating the remaining 50% of the mixture prepared in the step (4) on a surface of a fiber composition with a reticular structure and curing at a temperature of 40° C. for 4 h; and
(8) putting the mixed fiber material prepared in the step (7) into a mold, and injecting the mixed rubber compound mixed in the step (6) to form a toe cap-shaped nanocomposite material.

The fiber composition was configured to have a reticular structure formed by interweaving a plurality of composite fibers, and each composite fiber was twisted together by glass fiber, carbon fiber and asbestos fiber. The glass fiber was alkali-free glass fiber; the diameter of glass fiber was 30 microns, the diameter of carbon fiber was 30 microns and the diameter of asbestos fiber was 80 microns.

The preparation method of the modified boron nitride was as follows:
putting hexagonal boron nitride and 5-aminovaleric acid into ball milling equipment, adding ethanol, implementing ball milling, followed by filtering and drying, subsequently adding the mixture into a concentrated sulfuric acid solution, and then adding aminophenyl diazonium salt for a coupling reaction to obtain the modified boron nitride.

The silane coupling agent was a composition of vinyl trimethoxysilane, γ-glycidyl ether oxypropyl trimethoxysilane and γ-aminopropyl triethoxysilane, and the mass ratio of the three was 1:4:3.

The dispersant was vinyl bisstearamide. The curing agent was tert-butyl peroxybenzoate. The mesh number of talcum powder was 1250 mesh.

Example 4

Example 4 of the present invention provided a nanocomposite material for toe cap production, which included the following raw materials in parts by weight:
35 parts of graphene, 18 parts of carbon nanotubes, 90 parts of fiber composition, 10 parts of a silane coupling agent, 2 parts of acetic acid, 60 parts of acrylate rubber, 5 parts of a dispersant, 150 parts of polyethylene resin, 20 parts of nano silicon carbide, 5 parts of calcium stearate, 5 parts of zinc stearate, 20 parts of talcum powder, 10 parts of modified boron nitride and 65 parts of a curing agent.

The preparation method of the nanocomposite material included the following steps:
(1) preparing materials;
(2) preparing graphene into graphene oxide by a Hummers method;
(3) immersing graphene oxide, carbon nanotubes and nano silicon carbide in the silane coupling agent, and reacting at 80° C. for 1 hour;
(4) putting the mixture obtained in the step (3) and the ground talcum powder into a high-speed stirrer to be stirred for 35 min, and adding the acetic acid into the talcum powder under stirring;
(5) continuously adding the dispersant, the calcium stearate, the zinc stearate, the modified boron nitride and the curing agent for full and uniform mixing;
(6) adding the crylate rubber and the polyethylene resin into an internal mixer for internal mixing, and then putting an internally mixed rubber compound and 50% of the mixture prepared in step (4) into an open mill for mixing at 110° C. for 6 min;

(7) coating the remaining 50% of the mixture prepared in the step (4) on a surface of a fiber composition with a reticular structure and curing at a temperature of 40° C. for 3 h; and (8) putting the mixed fiber material prepared in the step (7) into a mold, and injecting the mixed rubber compound mixed in the step (6) to form a toe cap-shaped nanocomposite material.

The fiber composition was configured to have a reticular structure formed by interweaving a plurality of composite fibers, and each composite fiber was twisted together by glass fiber, carbon fiber and asbestos fiber. The glass fiber was alkali-free glass fiber; the diameter of glass fiber was 15 microns, the diameter of carbon fiber was 20 microns and the diameter of asbestos fiber was 60 microns.

The preparation method of the modified boron nitride was as follows:

putting hexagonal boron nitride and 5-aminovaleric acid into ball milling equipment, adding ethanol, implementing ball milling, followed by filtering and drying, subsequently adding the mixture into a concentrated sulfuric acid solution, and then adding aminophenyl diazonium salt for a coupling reaction to obtain the modified boron nitride.

The silane coupling agent was a composition of vinyl trimethoxysilane, γ-glycidyl ether oxypropyl trimethoxysilane and γ-aminopropyl triethoxysilane, and the mass ratio of the three was 1:3:3.

The dispersant was vinyl bisstearamide. The curing agent was tert-butyl peroxybenzoate. The mesh number of talcum powder was 900 mesh.

The materials of Examples 1-4 per cubic decimeter were tested, and the test data are shown in Table 1 below.

| | Example 1 | Example 2 | Example 3 | Example 4 |
|---|---|---|---|---|
| Tensile strength (Mpa) | 189 | 210 | 250 | 193 |
| Tensile growth rate (%) | 2.86 | 2.94 | 2.99 | 2.90 |
| Hardness | 161 | 168 | 175 | 163 |
| Impact strength (Kj/m$^2$) | 274 | 280 | 289 | 276 |
| Water resistance-mass loss (%) | 0.19 | 0.14 | 0.1 | 0.16 |
| Binding force-mass loss (%) | 0.08 | 0.05 | 0.02 | 0.06 |
| Bending strength (Mpa) | 190 | 215 | 256 | 197 |
| Abrasion resistance (grade) | one | one | one | one |

As can be seen from Table 1, the nanocomposite material has high toughness and strength, good water resistance, wear resistance and aging resistance, good bonding effect between all materials and fiber composition, and thus has good mechanical properties.

The above examples are preferred embodiments of the present invention, but the embodiments of the present invention are not limited by the above embodiments, and any other changes, modifications, substitutions, combinations and simplifications made without departing from the spirit and principle of the present invention shall be equivalent substitutions, which shall be included in the protection scope of the present invention.

What is claimed is:

1. A method for preparing a nanocomposite material for toe cap production, comprising the following steps:
   (1) preparing the following raw materials: 20-40 parts of graphene, 10-20 parts of carbon nanotubes, 50-100 parts of a fiber composition, 5-10 parts of a silane coupling agent, 2-5 parts of acetic acid, 40-80 parts of acrylate rubber, 1-5 parts of a dispersant, 100-150 parts of polyethylene resin, 10-20 parts of nano silicon carbide, 5-10 parts of calcium stearate, 5-10 parts of zinc stearate, 10-20 parts of talcum powder, 10-20 parts of modified boron nitride and 60-80 parts of a curing agent;
   (2) preparing graphene into graphene oxide by a Hummers method;
   (3) immersing the graphene oxide, the carbon nanotubes and the nano silicon carbide in the silane coupling agent, and reacting at 80-90° C. for 1-2 hours;
   (4) putting the mixture obtained in the step (3) and the talcum powder into a stirrer to be stirred for 10-40 min, and adding the acetic acid into the talcum powder under stirring;
   (5) continuously adding the dispersant, the calcium stearate, the zinc stearate, the modified boron nitride and the curing agent into the mixture obtained in the step (4) for full and uniform mixing;
   (6) adding the acrylate rubber and the polyethylene resin into an internal mixer for internal mixing, and then putting the internally mixed rubber compound and 50% of the mixture prepared in step (4) into an open mill for mixing at 100-110° C. for 6-8 min;
   (7) coating the remaining 50% of the mixture prepared in the step (4) on a surface of the fiber composition with a reticular structure and curing at a temperature of 20-40° C. for 2-4 h; and
   (8) putting the mixed fiber material prepared in the step (7) into a mold, and injecting the mixed rubber compound mixed in the step (6) to form a toe cap-shaped nanocomposite material.

2. The method according to claim 1, wherein the fiber composition is configured to have a reticular structure formed by interweaving a plurality of strands of composite fibers, and each strand of the composite fibers is twisted together by glass fiber, carbon fiber and asbestos fiber.

3. The method according to claim 2, wherein the glass fiber is alkali-free glass fiber; a diameter of the glass fiber is 10-30 microns, a diameter of the carbon fiber is 10-30 microns, and a diameter of the asbestos fiber is 50-80 microns.

4. The method according to claim 1, wherein a method for preparing the modified boron nitride is as follows:
   putting hexagonal boron nitride and 5-aminovaleric acid into ball milling equipment, adding ethanol, implementing ball milling, followed by filtering and drying, subsequently adding the mixture into a concentrated sulfuric acid solution, and then adding aminophenyl diazonium salt for a coupling reaction to obtain the modified boron nitride.

5. The method according to claim 1, wherein the silane coupling agent is configured to be a composition of vinyl trimethoxysilane, γ-glycidyl ether oxypropyl trimethoxysilane and γ-aminopropyl triethoxysilane, and a mass ratio of the three is 1:2-4:1-3.

6. The method according to claim 1, wherein the dispersant is vinyl bisstearamide.

7. The method according to claim 1, wherein the curing agent is tert-butyl peroxybenzoate.

8. The method according to claim 1, wherein a mesh number of the talcum powder is 800-1250 mesh.

* * * * *